(No Model.) 4 Sheets—Sheet 3.
C. W. SPONSEL.
MACHINE FOR CUTTING AND SHEARING METAL TUBES.
No. 540,881. Patented June 11, 1895.
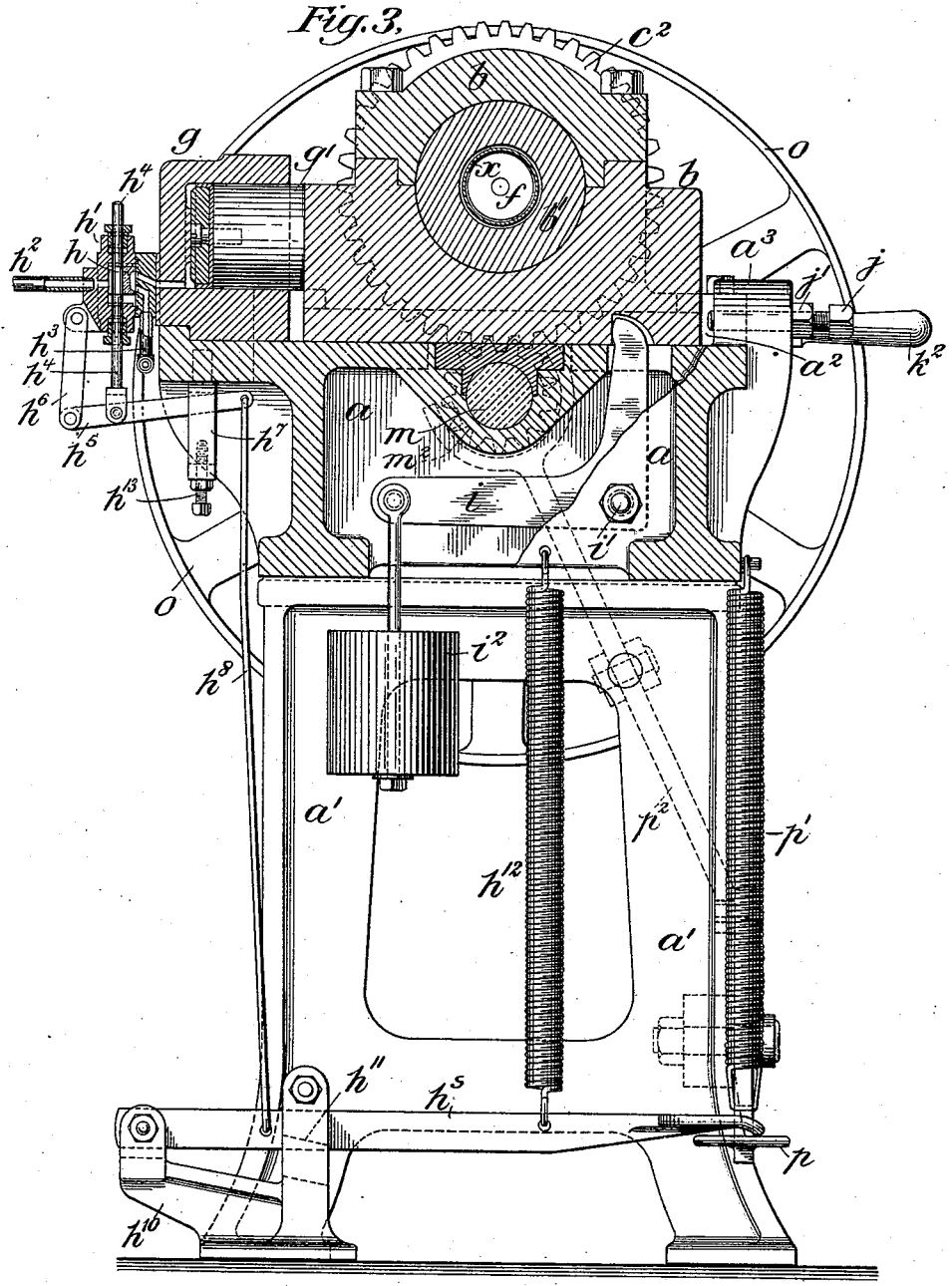
Witnesses:-
D. H. Hayward
E. M. Taylor
Inventor:
Charles W. Sponsel
By Redding & Kiddle
Attorneys (No Model.) 4 Sheets—Sheet 4.
C. W. SPONSEL.
MACHINE FOR CUTTING AND SHEARING METAL TUBES.
No. 540,881. Patented June 11, 1895.
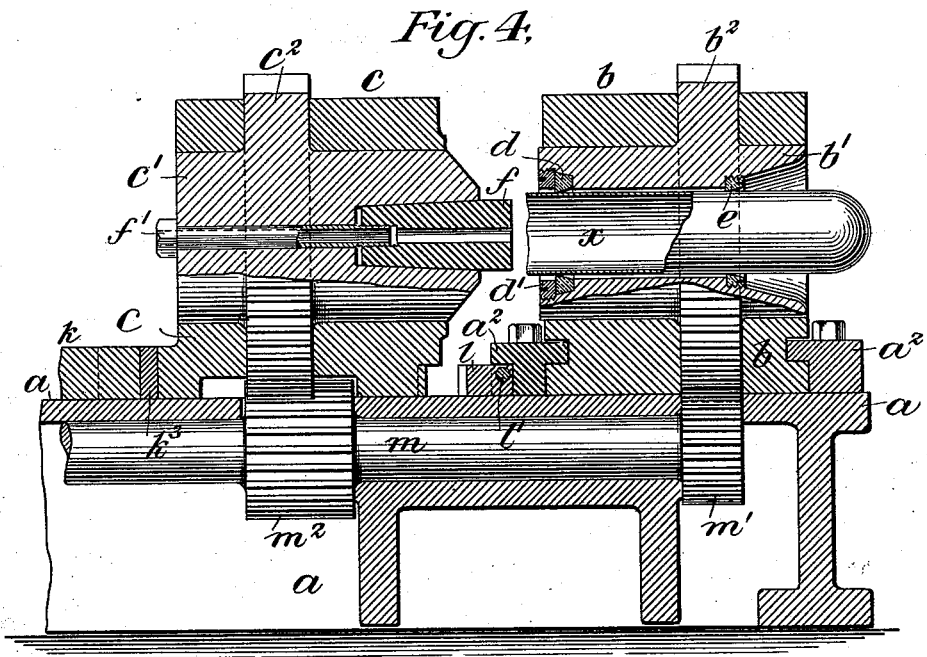
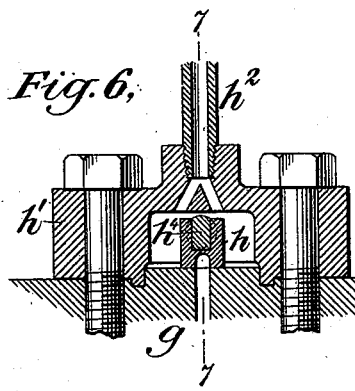
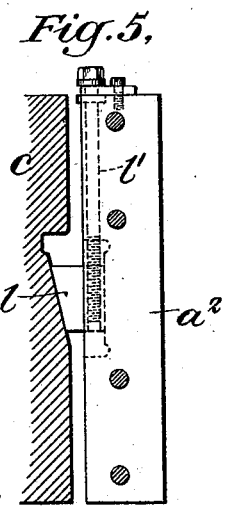
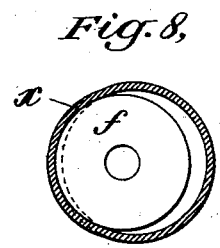
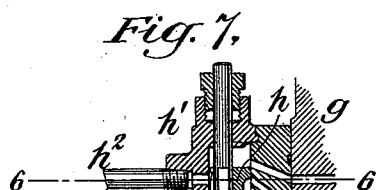
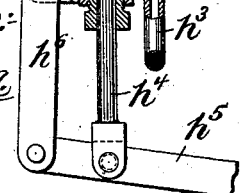
Witnesses:
D. H. Maynord
E. M. Taylor
Inventor:—
Charles W. Sponsel
By Redding & Kiddle
Attorneys

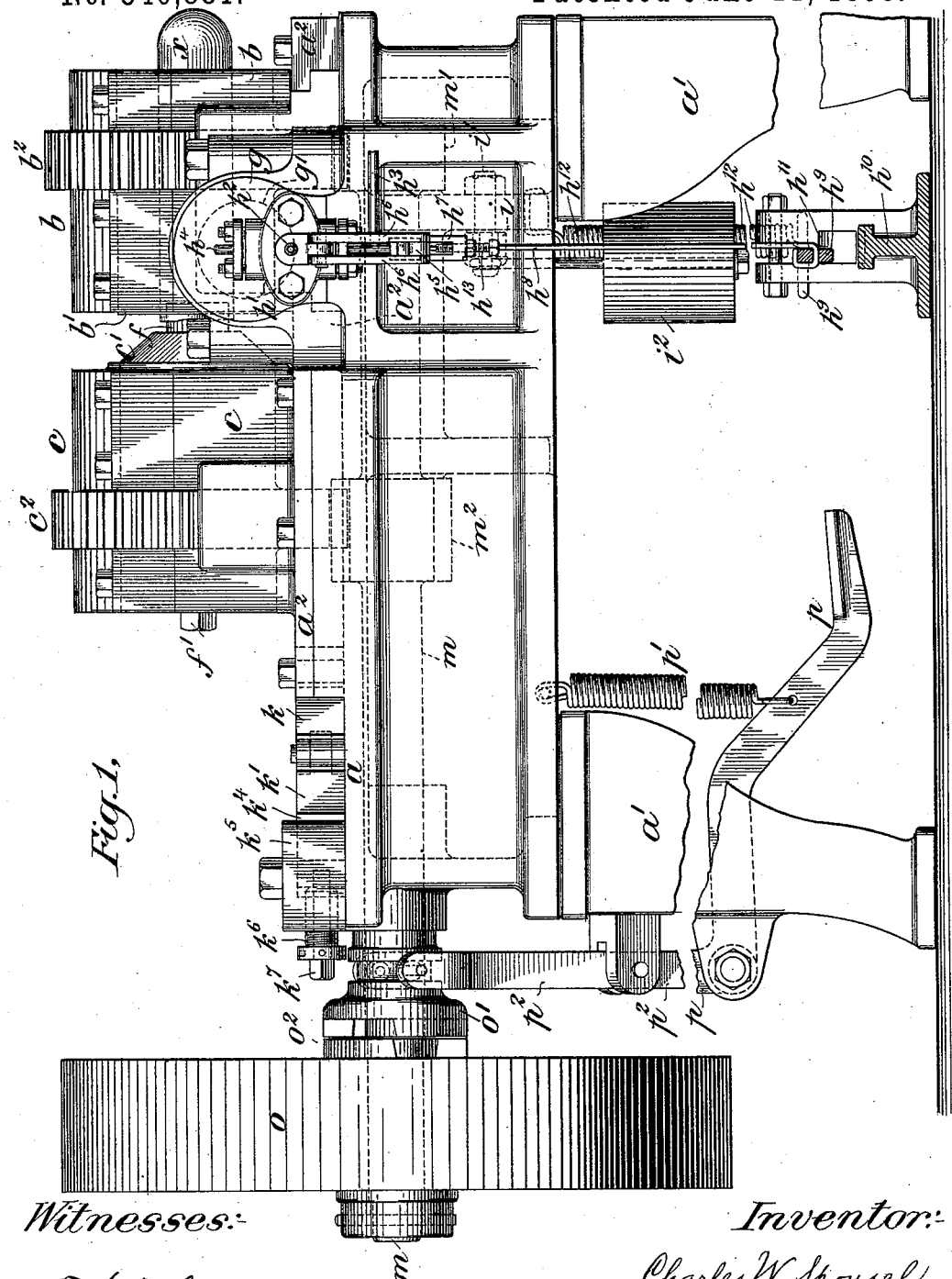

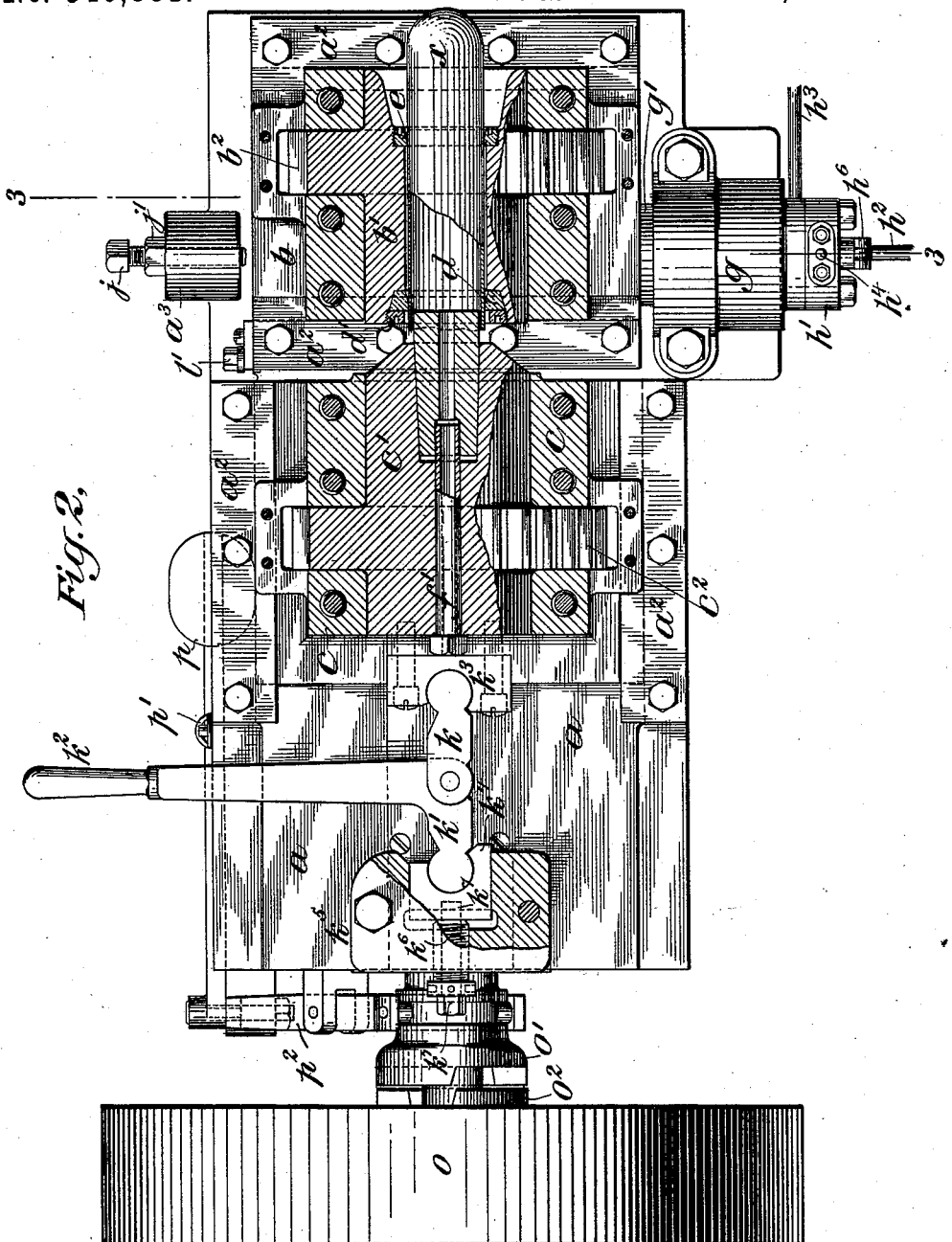

UNITED STATES PATENT OFFICE.

CHARLES W. SPONSEL, OF HARTFORD, CONNECTICUT, ASSIGNOR TO THE POPE MANUFACTURING COMPANY, OF SAME PLACE AND PORTLAND, MAINE.

MACHINE FOR CUTTING AND SHEARING METAL TUBES.

SPECIFICATION forming part of Letters Patent No. 540,881, dated June 11, 1895.

Application filed January 18, 1895. Serial No. 535,360. (No model.)

*To all whom it may concern:*

Be it known that I, CHARLES W. SPONSEL, a citizen of the United States, and a resident of the city and county of Hartford, State of Connecticut, have invented certain new and useful Improvements in Machines for Cutting and Shearing Metal Tubes, &c., of which the following is a specification, reference being had to the accompanying drawings, forming part hereof.

This invention relates to machines for cutting or shearing, and the machine hereinafter described embodying my invention is particularly adapted for cutting or shearing metal tubes or pipes, and may be employed for objects having portions of annular section or objects otherwise adapted to be operated upon in a machine embodying my invention.

In a machine embodying my invention a cutter carries or supports the tube to be operated upon, and means are employed adapted to co-operate with such cutter in shearing the tube, and for such purpose I have employed another cutter, and have arranged the two cutters eccentrically one within the other when in operative positions, and have actuated said cutters so as to cause them to roll together to circumferentially shear a tube. In a machine embodying my invention such cutters are mounted in standards and one of said standards is transversely movable in the machine and is actuated by a hydraulic piston to bring the cutters into desired eccentric operative positions, and the other standard is longitudinally movable so as to permit of longitudinal separation of such cutters to afford clearance for adjusting the tube and for ready removal of the sheared portion.

My invention includes other features and various improvements in construction, as more particularly hereinafter set forth and claimed.

The accompanying drawings illustrate a tube shearing machine embodying my invention.

Figure 1 is a rear side elevation. Fig. 2 is a plan view, partly in horizontal section, to more clearly show the construction of the cutters and other parts. Fig. 3 is a transverse vertical section on the line 3 3, Fig. 2. Fig. 4 is a longitudinal vertical section of the cutters and their sliding bearing-blocks and adjacent parts. Fig. 5 is a part horizontal section showing the wedge-stop for the longitudinally-moving cutter-standard. Fig. 6 is an enlarged horizontal section of the slide-valve controlling the hydraulic piston, which actuates the transversely-moving cutter-standard, said section being cut on the line 6 6, Fig. 7. Fig. 7 is an enlarged vertical section of the same on the line 7 7, Fig. 6. Fig. 8 is an enlarged sectional view, taken on the plane of the cutting-edges, illustrating the first part of the shearing operation.

The frame of the machine is shown as consisting of a bed or table $a$ supported on legs $a'$ $a'$, such frame being convenient and well adapted for the purpose although it is of course evident that any other suitable frame or support may be employed.

The bed or table $a$ is provided with a transverse slideway and with a longitudinal slideway, said slideways being shown as formed by the bed or table and the four bars $a^2 a^2$, bolted to the table, and within the transverse slideway is fitted the transversely moving cutter standard $b$, and within the longitudinal slideway is fitted the longitudinally moving cutter standard $c$. Each cutter standard is shown as containing a capped bearing for a rotating cutter head. The cutter head $b'$ of the transversely moving standard $b$, is fitted to rotate only in the bearing in said standard, being provided with a power receiving wheel shown as a gear wheel $b^2$, integral with said cutter head, which gear wheel rotates in a vertical opening in said standard and fits therein so as to have no longitudinal movement. The cutter head $c'$ of the longitudinally moving standard $c$ is also fitted to rotate only in its standard $c$, and has a power receiving wheel shown as a gear wheel $c^2$ integral with said cutter head $c'$ and fitted in a vertical opening in said standard $c$ so as to have no longitudinal movement relatively to said standard $c$.

The cutter head $b'$ of the transversely moving standard $b$, is adapted to carry the tube to be operated upon, and for that purpose has an opening extending therethrough to receive said tube, and said tube is lettered $x$ and is shown as closed at the end opposite to the end which is to be operated upon by the cutters, or in the form of a cup such as is formed during the operation of cupping and drawing tubes. In the construction shown, the tube or cup $x$ is supported at two points, the rear support being the outer cutter $d$, preferably a hardened steel ring removably set into the cutter head and held in place by a ring-shaped nut $d'$, and the front and auxiliary support being a ring-shaped piece $e$, screwed into the cutter head near the front end of the cutter head. Thus the cutter $d$ supports the tube around the entire circumference of the tube and supports the tube against the action of the other cutter during the shearing operation. It is evident that the cutter may be made of greater length and may be alone depended upon to directly support and carry the tube. The tube fits within the cutter $d$ and auxiliary support $e$ and may be readily placed therein and adjusted so as to bring the circumferential line on which the tube is to be sheared exactly in juxtaposition to the rear or cutting edge of the cutter $d$.

The cutter head $c'$ of the longitudinally moving standard $c$, is provided with the inner cutter $f$, said cutter being shown as provided with a tapering shank set into the cutter head $c'$ and held in place by a bolt $f'$ extending forwardly from the rear end of the cutter head $c'$ and threaded into the tapering shank of the cutter $f$. The bolt $f'$ is shown as hollow and the cutter $f$ with a cylindrical opening extending therethrough, the object of this opening being to permit the insertion of a rod to drive out a cup or closed tube in the event of a burr being formed in the cutting operation which burr would tend to hold the cup in place. The longitudinally moving cutter head $c'$ is shown in Figs. 1 and 2 in its extreme forward position with the forward or cutting edge of the inner cutter $f$ in desired longitudinal position and ready to perform the cutting or shearing operation upon suitable transverse movement of the cutter $d$ and upon rotative movements of the cutters.

For actuating the transversely moving standard $b$, I provide a hydraulic or fluid operated piston working within the cylinder $g$, said cylinder being shown as rigidly bolted to the bed $a$, and the hydraulic piston $g'$ is shown as provided with packing of well known construction and as pressing directly against the transversely moving standard $b$. The flow of fluid into and out of the cylinder $g$ is controlled by a suitable valve, shown as a slide valve $h$ fitted to slide vertically in a valve chest $h'$, and so that in its lower position, as shown in Fig. 7, it opens a passageway from the inlet pipe $h^2$ into the cylinder $g$, and closes the passageway to the outlet pipe $h^3$; and in the upper position, as shown in Fig. 3, the valve closes the passageway from the inlet pipe $h^2$ and opens the passageway from the cylinder $g$ to the outlet pipe $h^3$.

This valve $h$ is shown as carried by the rod $h^4$ extending vertically through said valve chest and having at its lower end a pivotal connection with the lever $h^5$, said lever $h^5$ having a swinging pivot in links $h^6$ joined to the valve chest, and said lever being movable vertically in a guide frame $h^7$, and connected at the end farthest from its pivot, by a connecting rod, cord or wire $h^8$ to a treadle $h^9$ shown as pivoted in a separate standard $h^{10}$, and said treadle standard is provided with a step $h^{11}$ (see Fig. 1 in which said standard is in section to more clearly show this step) under which step the treadle, which is free to move slightly in a lateral direction, is swung by the operator to hold the treadle in lower position and the valve $h$ in lower position or with the inflow passageway open during the cutting operation. A spring $h^{12}$ is shown as extending from the treadle $h^9$ to a suitable part of the frame and tends to hold the treadle in upper position, and therefore the normal position of the valve $h$ is its upper position or with the outflow passageway open. An adjustable stop to the downward movement of the lever $h^5$ is provided in the guide frame $h^7$, consisting of a stop screw $h^{13}$ tapped into said frame at the lower end thereof and provided with a jam nut.

The transversely moving cutter standard $b$ is held against the hydraulic piston $g'$ with a yielding pressure so as to follow the movements thereof, and this is shown as provided for by the swinging bell lever $i$, pivoted at $i'$ on the bed $a$, and having a horizontal arm from which depends a weight $i^2$, and a vertical arm which enters a notch in said standard $b$ and presses against a suitable shoulder formed therein. It is of course evident that other suitable retracting means may be employed or that retracting means may not be required in some constructions embodying my invention.

An adjustable stop to the forward movement of the cutter standard is provided, and is shown as consisting of a set screw $j$ working in a lug $a^3$ of the bed $a$ and having a jam nut $j'$. This stop regulates the degree of penetration of the cutting edges into the material of the tube, and the position of this stop may be delicately adjusted in accordance with the thickness of the material and as desired.

Means are provided for actuating the longitudinally moving cutter standard $c$, and for such purpose I have employed toggle levers $k$, $k'$, the toggle lever $k'$ being provided with a suitable actuating handle $k^2$. The toggle levers $k$, $k'$ are pivoted together, and the toggle lever $k$ has a rounded end working in a suitable bearing shown as consisting of a block $k^3$ bolted to the cutter standard $c$, and the toggle lever $k'$ has a rounded end working in a thrust block $k^4$, and means are provided for adjusting the position of said thrust block so as to nicely determine the extreme forward position to which the longitudinally moving cutter standard will be moved by swinging the toggle levers into the straight position shown. To this end the thrust block $k^4$ is longitudinally movable in the guide block $k^5$, said guide block being shown as rigidly held to the bed $a$ by bolts, and a hollow bolt $k^6$ is threaded into said guide block and bears against the rear end of the thrust block $k^4$, and a bolt $k^7$ passes through the hollow bolt $k^6$ and is threaded into the rear end of the thrust block $k^4$, and the head of the bolt $k^7$ bears against the end of the hollow bolt $k^6$. In this construction the thrust block holding bolt $k^7$ may be used to jam the hollow bolt $k^6$ in desired position.

The bearings of the toggle levers in the block $k^3$ of the longitudinally moving cutter standard $c$ and in the thrust block $k^4$ are shown as extending beyond a semi-circle so that the toggle levers will be held against longitudinal movements relatively to their bearings and thus the toggle levers will actuate the cutter standard in both directions.

A stop is provided to the forward movement of the longitudinally sliding cutter standard $c$, said stop consisting of a wedge $l$ (see Figs. 4 and 5) fitted to slide in the bar $a^2$ which extends transversely across the machine between the two cutter standards, and this wedge $l$ stops the forward movement of the cutter standard $c$ by contact with a suitable inclined surface thereof as shown. The adjustment of this wedge $l$ is provided for by means of a rod $l'$, which rod extends through the bar $a^2$ in which the guide is fitted to slide and is suitably held against longitudinal movement relatively to said bar $a^2$, and is threaded into the wedge $l$ so that rotative movement imparted to said rod $l'$ will cause the wedge $l$ to be moved transversely of the machine and will thus adjust the stopping position of the longitudinally moving cutter standard $c$. It is of course evident that this stop, which determines the longitudinal position of the inner cutter $f$ relatively to the outer cutter $d$ should be capable of nice adjustment and should be immovable by the standard from said adjusted position, and these features are attained in the construction above described.

Rotary movement is imparted to the cutter heads $b'$ and $c'$, and this I have provided for by the driving shaft $m$ fitted to rotate in bearings formed in the bed $a$, and this driving shaft $m$ is provided with two pinions, the pinion $m'$ meshing into the gear wheel $b^2$ on the transversely moving cutter head $b'$, and the pinion $m^2$ meshing into the gear wheel $c^2$ on the longitudinally moving cutter head $c'$. The gear wheel $b^2$ is carried by its transversely moving standard in a transverse direction but this slight change of position does not materially affect its engagement with the pinion $m'$. The gear wheel $c^2$ is carried by its longitudinally moving standard in a longitudinal direction and therefore the pinion $m^2$ is of sufficient width to engage with said gear $c^2$ in all positions of said gear $c^2$. I have made this pinion $m'$ somewhat smaller than the pinion $m^2$, and the gear wheel $b^2$ somewhat larger than the gear wheel $c^2$, so as to compensate for the slight difference in the diameters of the inner and the outer cutters and to cause the cutter edges to move at the same peripheral speed so that the relative movements of the cutter edges when in operative positions are a rolling movement of one cutter around the periphery of the other.

Motion is imparted to the driving shaft $m$ by means of a driving pulley $o$, said driving pulley being fitted to rotate upon the shaft $m$ but without imparting movement thereto except when engaged by a clutch $o'$. This clutch $o'$ is fitted to move longitudinally on the shaft $m$ and is suitably held by a spline and slot, as well understood, so as to rotate with said shaft $m$, and when the clutch $o'$ is moved toward the driving pulley $o$, its teeth engage with the teeth $o^2$ upon the driving pulley $o$. The clutch $o'$ is actuated from a treadle $p$ said treadle being normally held in upper position by a spring $p'$ suitably connected to the frame, and said treadle having a vertical arm connected with a pivoted lever $p^2$, and the upper end of said lever $p^2$ being yoked and provided with pins working in a circumferential groove in the clutch $o'$. The spring $p'$ holds the clutch normally out of engaging position and the driving pulley thus normally does not actuate the shaft $m$, but when the treadle $p$ is depressed the clutch moves into engaging position and the shaft $m$ rotates with the driving pulley and the cutter heads and cutters carried thereby are caused to rotate. This mechanism is well adapted for the purpose and gives a rapid engagement and disengagement, but it is of course evident that in modified constructions other varieties of stopping and starting mechanism may be employed in place of the clutch mechanism shown.

When a tube is to be inserted into the machine and adjusted preparatory to the shearing operation, it is usually desirable to have the longitudinally movable cutter in extreme backward position as shown in Fig. 4, so that the cutters will be separated longitudinally a considerable distance and the operator may freely examine the tube end as he adjusts the tube in place.

In cupping and drawing operations the heads of the cups or tubes assume an irregular or ragged shape and these irregularities tend to increase in subsequent operations. It is therefore desirable that the cups or tubes should be trimmed or sheared so as to remove all irregular or ragged portions and it is to this operation of trimming such ragged edges that my invention has been mainly applied. The operator inserts the cup or tube into the cutter head $c'$ and adjusts it therein so as to register the outer cutter $d$ along the circumferential line on which the cut is to be made. Then the handle $k^2$ of the toggle levers is operated to move the cutter $f$ forward into desired longitudinal position for the performance of the cutting operation. The cutters are now arranged concentrically one with the other and in desired longitudinal positions but out of contact with each other as shown in Figs. 1, 2 and 3. The operator next depresses the treadle $h^9$ thereby opening the inflow passage-way of the hydraulic cylinder $g$ and the pressure of the fluid flowing into the hydraulic cylinder actuates the piston $g'$ and moves the transversely moving standard $b$ so as to bring the cutters into eccentric operative positions, and make the initial cut of the shearing operation, the positions of the cutters at this stage of the operation being shown in Fig. 8. The operator now moves the treadle $h^9$ under its step $h^{11}$ and thus the treadle is held down and the fluid pressure maintained and the standard $b$ pressed against the adjustable stop $j$. With the parts in this position the operator depresses the treadle $p$ thus throwing the clutch $o'$ into engagement with the driving pulley $o$ and the driving pulley now rotates the driving shaft $m$ and through the pinions $m'$ and $m^2$ meshing into the gears $b^2$ and $c^2$ causes the cutters to rotate so as to roll together and the tube is carried around by the cutters and sheared around its entire circumference. Upon the completion of about one revolution of the cutters the shearing operation will be completed and the treadle $p$ may then be allowed to return to upper or normal position thus stopping the rotation of the driving shaft $m$, and the treadle $h^9$ may be disengaged from its step so as also to return to upper or normal position and thereby the outflow passage-way from the hydraulic cylinder will be opened and the fluid pressure in said cylinder relieved and the standard $b$ will be moved backward by its counter weight $i^2$ to normal position. The operator now actuates the handle $k^2$ of the toggle levers so as to move the cutter $f$ backward and then by reason of the clearance between the cutters the annular strip cut off in the shearing operation may be readily removed from the machine. The tube or cup may now be removed and another tube or cup inserted and the operations above described repeated.

It is of course evident that the precise order of operations above described may be varied under varied conditions and as desired. When the cutters are brought into their eccentric operative positions they act to firmly clamp the tube into position and during the remainder of the cutting operation this clamping action is continued so that the tube is carried around with the cutters as they roll together. It is therefore unnecessary to provide any other means for clamping the tube in place and the work of inserting and adjusting the tube is therefore exceedingly simple and may be very rapidly performed.

The amount of movement imparted to the transversely moving standard in the construction shown is just sufficient to make the edge of the outer cutter $d$ tangentially touch the edge of the inner cutter $f$ (see Fig. 8) but it is of course evident that a greater or less movement may be imparted to the transversely movable cutter as may be desirable. When the cutters are in operative position they are eccentrically arranged one within the other and this will be true whether the cutting edges do not touch or touch at a single point of tangency or slightly overlap so as to actually touch at two separate points.

It is of course evident that various modifications may be made in the construction shown in the drawings and above particularly described without departing from my invention and that parts of my invention may be used separately or in combination with other parts of different construction. I do not therefore limit my invention to the particular construction above described, but

What I claim, and desire to secure by Letters Patent, is—

1. The combination of two cutters arranged eccentrically one within the other when in operative positions, one of said cutters being movable transversely relatively to the other cutter toward and from the periphery of said other cutter, and one of said cutters being movable relatively to the other cutter around the periphery of said cutter, substantially as set forth.

2. The combination of two cutters adapted to co-operate in circumferentially shearing a tube, said cutters being arranged eccentrically one within the other when in operative positions, and one of said cutters being movable transversely relatively to the other cutter toward and from the periphery of said other cutter and one of said cutters constituting the tube carrier, substantially as set forth.

3. The combination of two cutters adapted to co-operate in circumferentially shearing a tube, said cutters being arranged eccentrically one within the other when in operative positions, and one of said cutters being movable transversely relatively to the other cutter toward and from the periphery of said other cutter and one of said cutters constituting the tube carrier, and actuating means whereby such movements are imparted to said cutters that one of said cutters is caused to roll around the periphery of the other cutter and the tube is thereby sheared circumferentially, substantially as set forth.

4. The combination of two cutters arranged eccentrically one within the other when in operative positions, and adapted to co-operate in circumferentially shearing a tube one of said cutters constituting the tube carrier, and actuating means for moving one of said cutters toward the periphery of the other cutter and thereby bringing said cutters into operative positions, and means for rotating said cutters to perform the cutting operation, and for returning said cutters to inoperative positions, substantially as set forth.

5. The combination of two cutters having circular cutting edges adapted to co-operate in performing a cutting or shearing operation, said cutters being normally separated with their cutting edges in different planes, and means for bringing said cutting edges into operative positions, in the same plane and for operating said cutters to circumferentially shear a tube, substantially as set forth.

6. The combination of two cutters arranged eccentrically one within the other when in operative positions, one of said cutters being movable longitudinally relatively toward and from the other cutter, and one of said cutters being movable transversely with respect to the other cutter and means for bringing said cutters into proper longitudinal positions for the cutting operation, means for bringing said cutters transversely into operative position and means for actuating said cutters to perform the cutting operation, substantially as set forth.

7. The combination with two cutters arranged eccentrically one within the other when in operative positions, of a hydraulic piston for bringing said cutters into such eccentric operative positions and a cylinder and valve for said piston, and means for rotating said cutters, substantially as set forth.

8. The combination of a transversely moving standard and a cutter carried thereby, and another cutter, said cutters being adapted to co-operate in circumferentially shearing a tube, and being arranged eccentrically one within the other when in operative positions, one of said cutters constituting the tube carrier, of means for moving said standard to bring the edges of the cutters together and means for rotating said cutters, substantially as set forth.

9. The combination of a transversely moving standard and a cutter carried thereby and a separate longitudinally moving standard independent of the first named standard and a cutter carried thereby, and means for actuating said longitudinally moving standard to bring the cutters into desired longitudinal positions for the cutting operation or to separate said cutters longitudinally, and means for actuating said transversely moving standard to bring the cutters together into operative positions or to separate said cutters transversely, and means for rotating said cutters, substantially as set forth.

10. The combination of a standard, a hollow cutter head fitted to rotate therein, and means including a cutter in said cutter head for carrying within said head a tube to be operated upon, a power receiving wheel on said cutter head and means for actuating the same to rotate the cutter head, and another cutter adapted to co operate with said cutter in the cutter head in circumferentially shearing a tube, said cutters being arranged eccentrically one within the other when in operative positions substantially as set forth.

11. The combination of a movable standard, a hollow cutter head fitted to rotate therein, and means including a cutter in said cutter head for carrying within said head a tube to be operated upon, a power receiving wheel on said cutter head and means for actuating the same to rotate the cutter head, another cutter adapted to co-operate with said cutter in the cutter head in circumferentially shearing a tube, said cutter being arranged eccentrically within the tube carrying cutter and means for moving said standard to bring said cutters into operative positions, substantially as set forth.

12. The combination of a movable standard, a cutter head fitted to rotate therein, and means including a cutter in said cutter head for carrying a tube to be operated upon, and means for rotating said cutter head, another cutter adapted to co-operate with said cutter in the cutter head in circumferentially shearing a tube, a hydraulic piston for actuating said standard to bring the cutters into operative positions, and a cylinder and valve for said piston, substantially as set forth.

13. The combination of a movable standard, a cutter head fitted to rotate therein and a cutter in said cutter head, another cutter adapted to co-operate with said cutter in the cutter head in circumferentially shearing a tube, one of said cutters being adapted to carry the tube, a hydraulic piston for actuating said standard to bring the cutters into operative positions, and a cylinder and valve for said piston, and a treadle for operating said valve, and a stop to limit the movement of said standard and means for retracting the standard, substantially as set forth.

14. The combination of two cutters, adapted to co-operate in shearing a tube, a longitudinally movable standard carrying one of said cutters, whereby said latter cutter is movable into and out of working position relatively to the other cutter and toggle levers for actuating said standard, substantially as set forth.

15. The combination of two cutters adapted to co-operate in shearing a tube, a longitudinally movable standard carrying one of said cutters, an adjustable wedge stop to the forward movement of said standard, and means for moving said standard, substantially as set forth.

16. The combination of two cutters adapted to co-operate in shearing a tube, a longitudinally movable standard carrying one of said cutters, toggle levers for actuating said standard, an adjustable thrust block for said toggle levers and an adjustable wedge stop to the forward movement of said standard, substantially as set forth.

17. The combination of a transversely moving standard and a cutter carried thereby, said cutter being adapted to carry a tube to be sheared, and a hydraulic piston for actuating said standard and a cylinder and valve for said piston, a stop to limit the movement of said standard, a longitudinally moving standard and a cutter carried by said longitudinally moving standard and means for actuating said longitudinally moving standard to bring the cutters into desired longitudinal positions for the cutting operation or to separate said cutters longitudinally, substantially as set forth.

18. The combination of a transversely moving standard, a cutter head fitted to rotate therein, and means including a cutter in said cutter head for carrying a tube to be operated upon, a power receiving wheel on said cutter head and means for actuating the same to rotate the cutter head, a hydraulic piston for moving said standard and a cylinder and valve for said piston, a stop to limit the movement of said standard, a longitudinally moving standard and a cutter carried by said longitudinally moving standard, and means for actuating said longitudinally moving standard to bring the cutters into desired longitudinal positions for the cutting operation or to separate said cutters longitudinally, substantially as set forth.

19. The combination of a transversely moving standard and a cutter carried thereby said cutter being adapted to carry a tube to be sheared, a hydraulic piston for actuating said standard and a cylinder and valve for said piston, a stop to limit the movement of said standard, a longitudinally moving standard and a cutter carried by said longitudinally moving standard, and an adjustable wedge stop to the forward movement of said longitudinally moving standard, and means for actuating said longitudinally moving standard to bring the cutter into desired longitudinal position for the cutting operation or to separate said cutters longitudinally, substantially as set forth.

20. The combination of a transversely moving standard and a cutter carried thereby, said cutter being adapted to carry a tube to be sheared and a hydraulic piston for actuating said standard and a cylinder and valve for said piston, a stop to limit the movement of said standard, a longitudinally moving standard and a cutter carried by said longitudinally moving standard, and toggle levers for actuating said longitudinally moving standard, substantially as set forth.

21. The combination of a transversely moving standard and a cutter carried thereby, said cutter being adapted to carry a tube to be sheared, a hydraulic piston for actuating said standard and a cylinder and valve for said piston, a stop to limit the movement of said standard, a longitudinally moving standard and a cutter carried by said longitudinally moving standard, toggle levers for actuating said longitudinally moving standard, an adjustable thrust block for said toggle levers and an adjustable wedge stop to the forward movement of said longitudinally movable standard, substantially as set forth.

22. The combination of a transversely moving standard, a cutter head fitted to rotate therein and means including a cutter in said cutter head for carrying a tube to be operated upon, a power receiving wheel on said cutter head and means for actuating the same to rotate the cutter head, a hydraulic piston for moving said standard and a cylinder and valve for said piston, a stop to limit the movement of said standard, a longitudinally moving standard, a cutter head fitted to rotate in said longitudinally moving standard, a cutter in said cutter head and a power receiving wheel on said cutter head, and means for actuating said power receiving wheel to rotate the cutter head, toggle levers for actuating said longitudinally moving standard, an adjustable thrust block for said toggle levers and an adjustable wedge stop to the forward movement of said longitudinally moving standard, substantially as set forth.

23. The combination of a transversely moving standard, a cutter head fitted to rotate therein and means including the cutter in said cutter head for carrying a tube to be operated upon, a gear wheel on said cutter head, a hydraulic piston for moving said standard and a cylinder and valve for said piston, a stop to limit the movement of said standard, a longitudinally moving standard, a cutter head fitted to rotate therein, a cutter in said cutter head and a gear wheel on said cutter head, means for actuating said longitudinally moving standard to bring the cutter into desired longitudinal position for the cutting operation or to separate said cutters longitudinally, and a driving shaft provided with gearing actuating the gears of both cutter heads, substantially as set forth.

24. The combination of a transversely moving standard, a cutter head fitted to rotate therein, and means including a cutter in said head for carrying a tube to be operated upon, a gear wheel on said cutter head, a hydraulic piston for moving said standard and a cylinder and valve for said piston, a treadle for operating said valve, a stop to limit the movement of said standard, a longitudinally moving standard, a cutter head fitted to rotate therein, and a cutter carrying said cutter head and a gear wheel on said cutter head, a driving shaft provided with gears actuating the gears of both cutter heads, a clutch for connecting said shaft with means for imparting rotation thereto and a treadle for actuating said clutch, and means for actuating said longitudinally moving standard to bring the cutters into desired longitudinal positions for the cutting operation or to separate said cutters longitudinally, substantially as set forth.

25. The combination of a transversely moving standard, a cutter head fitted to rotate therein, and means including a cutter in said head for carrying a tube to be operated upon, a gear wheel on said cutter head, a hydraulic piston for moving said standard and a cylinder and valve for said piston, a treadle for operating said valve, a stop to limit the movement of said standard, a longitudinally moving standard, a cutter head fitted to rotate therein, a cutter in said cutter head and a gear wheel on said cutter head, a driving shaft provided with gearing actuating the gears of both cutter heads, a clutch for connecting said shaft with means for imparting rotation thereto and a treadle for actuating said clutch, toggle levers for actuating said longitudinally moving standard and an adjustable thrust block for said toggle levers and an adjustable wedge stop to the forward movement of said longitudinally moving standard, substantially as set forth.

26. The combination of a movable standard, a cutter head fitted to rotate therein and a cutter in said cutter head, another cutter adapted to co-operate with said cutter in the cutter head in circumferentially shearing a tube, one of said cutters being adapted to carry the tube, a hydraulic piston for actuating said standard to bring the cutters into operative positions, a cylinder and valve for said piston, a treadle for operating said valve, said treadle normally holding the valve in position to open the outflow passage-way from said cylinder, a step for holding said treadle out of normal position and so as to open the inflow passage-way into said cylinder and means for returning said treadle to normal position when released from said step, and a stop to limit the movement of said movable standard, substantially as set forth.

This specification signed and witnessed this 14th day of January, A. D. 1895.

CHARLES W. SPONSEL.

In presence of—
WILLIAM A. LORENZ,
W. H. HONISS.